United States Patent [19]

Harig

[11] 4,074,582
[45] Feb. 21, 1978

[54] HOISTING DEVICE

[75] Inventor: Manfred Harig, Lindlar-Linde, Germany

[73] Assignee: N.V. Western Gear Europe, S.D., Aartselaar, Belgium

[21] Appl. No.: 722,764

[22] Filed: Sept. 13, 1976

[30] Foreign Application Priority Data

Sept. 26, 1975 Belgium .................................... 254583
Dec. 1, 1975 Belgium .................................... 254684

[51] Int. Cl.² ...................... F16H 55/36; F16H 55/62
[52] U.S. Cl. .......................... 74/230.24; 74/230.17 M
[58] Field of Search .................... 74/230.17 M, 230.24

[56] References Cited

U.S. PATENT DOCUMENTS 3,836,120  9/1974  Niskin ........................... 74/230.17 M
3,966,170  6/1976  McKenna ....................... 74/230.17 M Primary Examiner—Leonard H. Germ
Attorney, Agent, or Firm—Bacon & Thomas

[57] ABSTRACT

The invention pertains to a hoisting device, characterized by the fact that it mainly consists of a housing to which the load is suspended, and in this housing a driving pulley consisting of two half pulleys for the cable, which is suspended from a fixed point, whereby this driving pulley is provided with means which press the cable uniformly or practically uniformly into the driving pulley over a large arc, and with means which press aforesaid half pulleys away from each other at the locations where the cable enters and leaves the pulley, in such a manner that no friction occurs when the cable enters or leaves the driving pulley, whereby this pressing apart is performed in such a manner that no or practically no increase of pressure occurs on the cable on the other side of the pulley.

27 Claims, 9 Drawing Figures

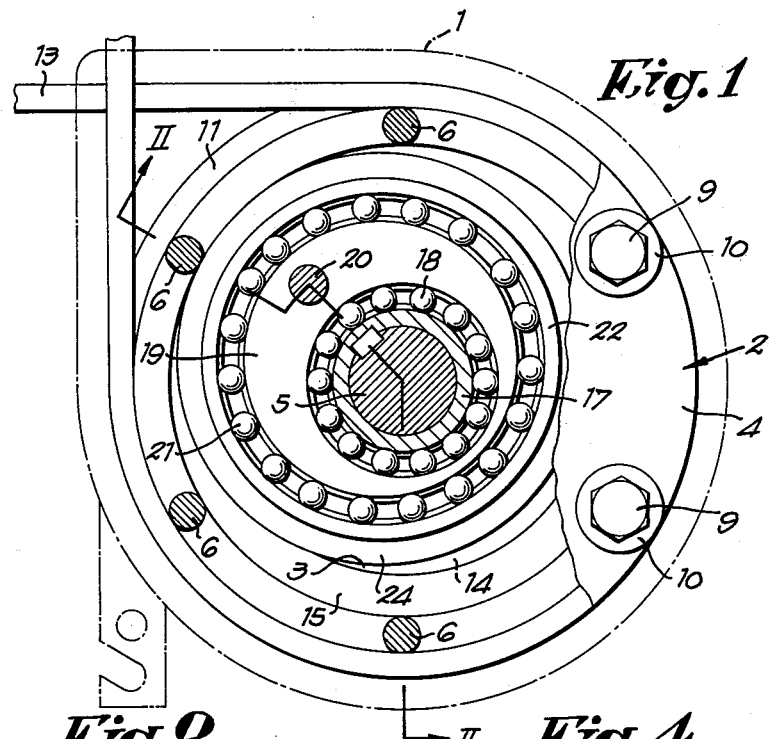
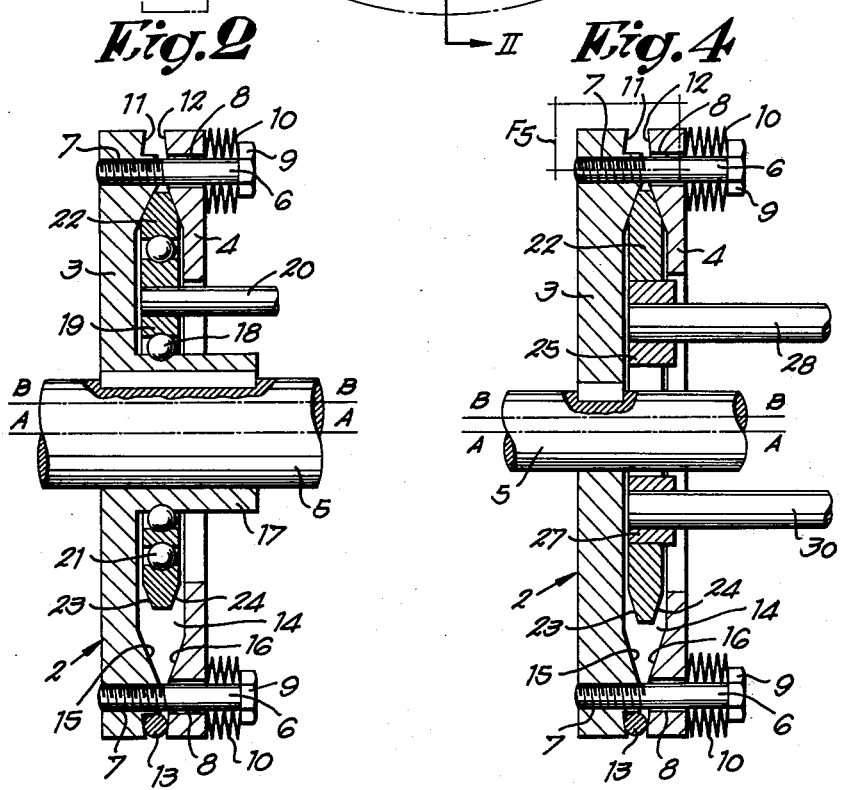

HOISTING DEVICE

The present invention relates to a hoisting device of the type which is more particularly intended for the vertical displacement of loads and which consists of a housing or frame containing amongst others a rotatably fitted driving pulley for a cable or suchlike, whereby means are provided in order to obtain a good cooperation between aforesaid driving pulley and cable.

In a first well known hoisting device, the cable is wound several times around the pulley for this purpose, but this gives rise to considerable and well known disadvantages such as the difficulty of maintaining the cable in the correct location, the wear produced thereby and the relatively elaborate construction.

It has already been suggested, in order considerably to simplify the construction, only to wind the cable once around aforesaid driving pulley, whereby means are provided for pressing this cable against the driving pulley, or respectively in a circumferential groove of this driving pulley, in order thus to increase the friction between cable and pulley. In well known forms of embodiment (German Pat. Nos. 325.438, 429.820, 449.153 and Swiss Pat. No. 119.296) such a hoisting device consists of a split driving pulley of which both halves are permanently pressed towards each other, thus firmly gripping and driving the cable, and whereby means are often provided for appropriately pulling the pulley halves apart in order to facilitate the entering and removing of the cable, respectively into and out of the pulley.

Such known devices have the disadvantage that the pressure exerted on the cable is far from being regularily distributed.

A first object of the invention is to build a hoisting device whereby at least one half pulley of the pulleys halves which are pressed towards each other is made so as to be distortable, it being understood that such distortion shall be only slight and local, or in other words is successively displaced along the circumference of the pulley, and whereby the distortion is such as to never exceed the limit of elasticity of the materials used.

One thus obtains on the one hand, that the cable is gripped, or respectively driven, uniformly or practically uniformly over a large arc, by the means which press the pulley halves with a predetermined pressure towards each other, whereas on the other hand, the spreading of the pulley halves on one side is such, that no or practically no pressure increase occurs on the cable at the other side of the pulley halves.

Another object of the invention is, that in a first form of embodiment, aforesaid means which keep the pulley halves apart are displaced towards the center of the pulleys in such a manner, that the local circumferential velocity of these means and the local circumferential velocity of the driving pulley are practically equal to each other, so that the friction and consequently also the generation of heat remain as small as possible, so that the hoisting device according to the invention can be maintained in continuous use.

A further object of the invention is that in a second form of embodiment, aforesaid means which maintain the pulley halves apart are displaced towards the outer circumference of the pulleys in such a manner that there is no difference in circumferential velocity between these means and the driving pulley, so that similarly in this case no detrimental friction or heat generation is caused.

Yet a further object of the invention is that the groove of the split driving pulley increases progressively towards the inside, one and other in such a manner that the cable is always pressed towards the bottom of the groove, due to the lateral pressure of the pulley halves.

The hoisting device which boasts aforesaid as well as other characteristics shall for this purpose mainly consist of a housing to which the load is suspended, and in this housing a driving pulley consisting of two pulley halves for the cable which is suspended from a fixed point; whereby this driving pulley is provided with means which grip the cable uniformly or practically uniformly in the pulley over a large arc, and with means which press the pulley halves apart at the locations of entry and release of the cable in such a manner that the pressure on the cable at the other side of the pulley is not or practically not increased.

In order to show more clearly the characteristics of the invention, a few forms of embodiment of the device according to the invention are described hereinafter, merely as examples and without the slightest intent at limitation, with reference to the appended drawings in which:

FIG. 1 shows a schematic and partially cutaway front view of a device according to the invention;

FIG. 2 shows a cross section according to line II—II in FIG. 1;

FIG. 4 is a cross section according to line IV—IV in FIG. 3;

Figure 3:
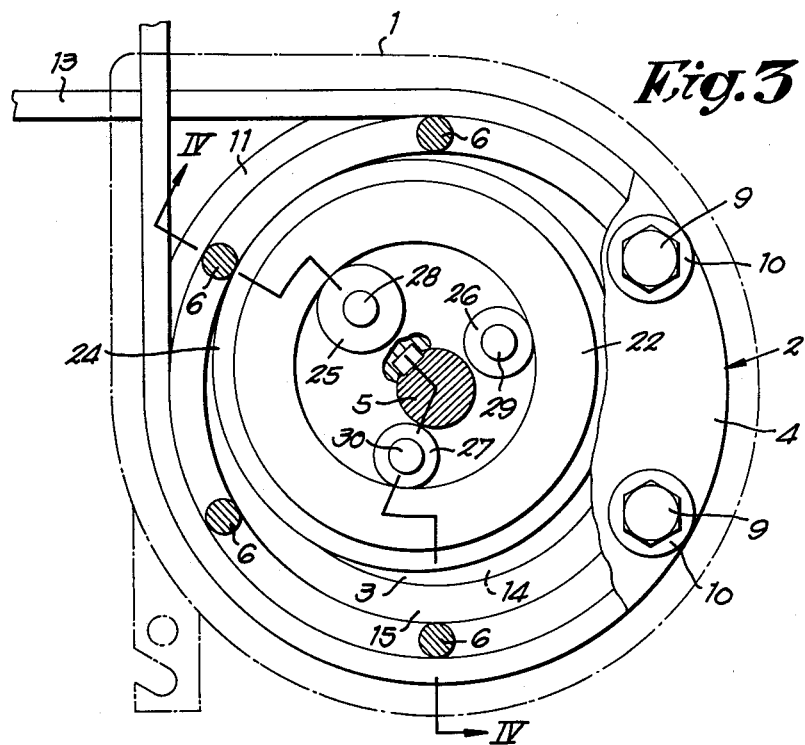
FIG. 3 is a similar view to that of FIG. 1, but for an alternative form of embodiment.

In FIGS. 1 and 2 the hoisting device according to the invention mainly consists of a housing 1 which is shown schematically. In this housing shafts are fitted, which are driven by appropriate means, such as for instance a motor, attached to housing 1, but not shown.

The hoisting mechanism itself consists of a driving pulley 2 with dovetail shaped groove, itself consisting of two elements or pulley halves, respectively 3 and 4, of which element 3 is appropriately fixed to a shaft 5, whereas element 4 is attached to element 3 by means of screw bolts 6. The latter each cooperate with a threaded bore 7 which is provided in element 3 of the pulley and pass freely through a hole 8 in element 4 of the driving pulley. Finally, a spring 10 is fitted between the head 9 of each bolt 6 and aforesaid element 4, which in the present case consist of dished springs.

It is clear, that the force with which the two pulley halves 3 and 4 are pressed towards each other is adjustable by the screwing in or out of aforesaid bolts 6, whereby this force shall be such that the cable is gripped without slippage between elements 3 and 4 and without any harmful distortion being caused to the cable.

Figure 5:
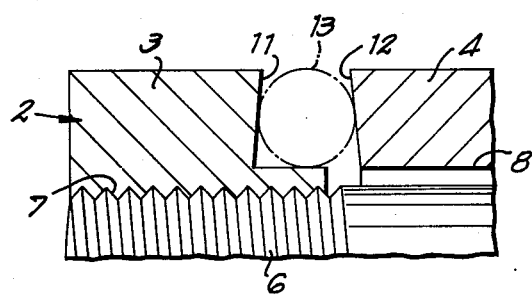
FIG. 5 shows to a larger scale that part of FIG. 4 indicated by F5.
Figure 6:
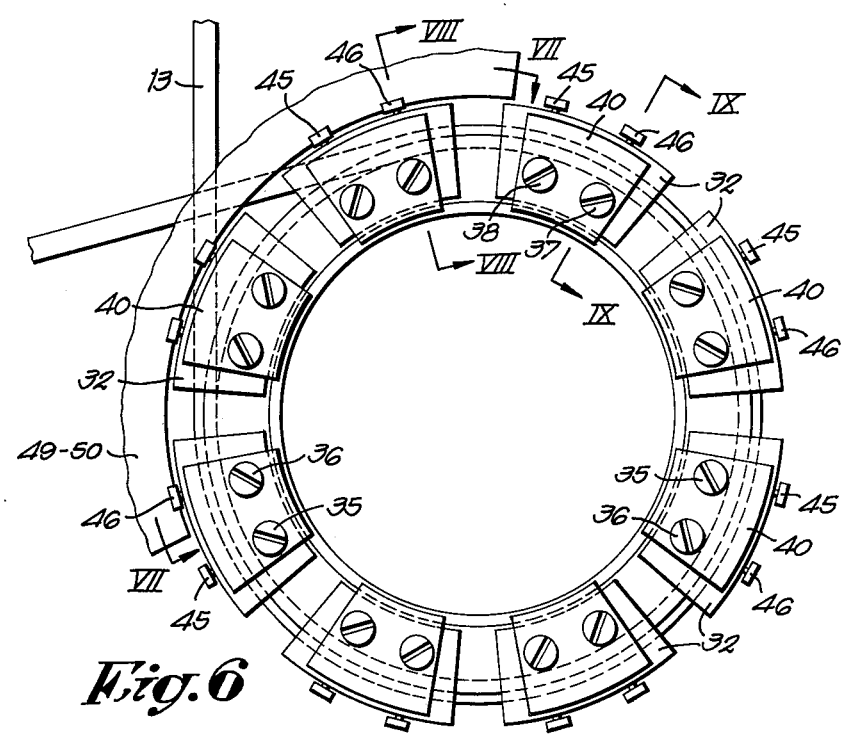
FIG. 6 is a similar view to that of FIG. 1, but for yet a further alternative form of embodiment.
Figure 7:
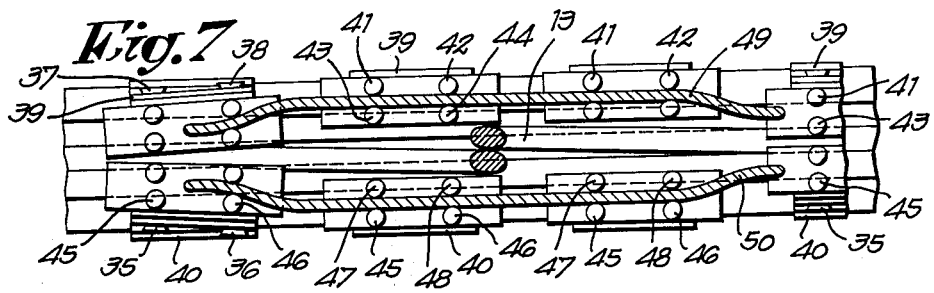
FIGS. 7, 8 and 9 show cross sections, respectively according to lines VII—VII, VIII—VIII and IX—IX in FIG. 6.
Figures 8, 9:
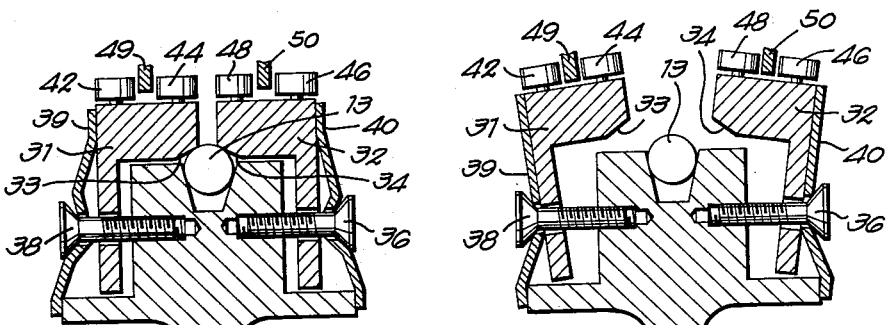

The pulley halves 3 and 4 are provided on the inside and over the entire circumference with a bevelled surface, respectively 11 and 12, with which the cable 13 can cooperate. As is most apparent in FIG. 5, these surfaces have been provided in such a manner that they form a conical groove which widens towards the inside in dovetail cross sectional shape, in such a manner that in consequence of the lateral pressure of the two pulley halves on the cable, the latter is permanently stressed towards the bottom of the groove, so that any possibility of the cable jumping the groove is totally eliminated. Between elements 3 and 4 of driving pulley 2 a space 14 is provided which consists for the major part of parallel surfaces of elements 3 and 4, whereby these surfaces are provided, towards the circumference of said elements, in the present case with conical parts, respectively 15 and 16. Each element 3 and 4 is thus provided as it were with a space in dinner plate shape.

In this form of embodiment, a ball bearing or suchlike 18 is fitted on shaft 5, or respectively on hub 17 of element 3. The latter is attached by means of a pin, rod, or suchlike 20 to the housing of the hoisting device in some manner not shown, one and other in such a manner that disc 19 is immovable with respect to this housing. This disc also runs on a ball bearing or suchlike 21, which is fitted in a ring 22, provided at its circumference with conical surfaces, respectively 23 and 24.

Excentric disc 19 is provided in such a manner, that ring 22, which is maintened fixed with respect to housing 1, acts upon the conical surfaces 15 and 16 of the driving pulley 2 in the course of the rotation of the latter, and such precisely between the locations where cable 13 enters and respectively leaves the driving pulley. One thus obtains, that at the locations where the cable enters and leaves the pulley, both elements 3 and 4 are pressed away from each other in order to permit the cable to enter and to leave the pulley freely without friction, whereas at the other side of the driving pulley, due to the presence of bolts 6 and of springs 10, cable 13 is firmly gripped between surfaces 11 and 12 and such over a very large arc and with a uniform or practically uniform pressure.

Due to the fact that ring 22 is of relatively large diameter with respect to the diameter of aforesaid opening 14, one simultaneously obtains that the difference in circumferential velocity of surfaces 23 and 24 with respect to surfaces 15 and 16 of elements 3 and 4 is so small, that only a very slight and permissible generation of heat occurs between ring 22 and elements 3 and 4.

In this case surfaces 15 - 16 and 23 - 24 pass ideally over each other so that friction, heat and wear are reduced to a bare minimum.

In FIGS. 3 and 4, a form of embodiment is shown, with which similar results are obtained as those described with reference to FIGS. 1 and 2, but in which case aforesaid ring 22 is supported by rollers, respectively 25, 26 and 27, which rotate freely around respective shafts 28, 29 and 30, which are attached in an appropriate but not shown manner to the casing of the hoisting device.

In these two forms of embodiment we thus obtain that the actual driving pulley rotates around a shaft A—A, whereas ring 22 rotates jointly around a shaft B-B either on the excentric disc 19, or respectively on the excentrically located rollers 25-26-27.

It is obvious that the closer shafts A-A and B-B lie together, the slighter the friction will be arising between ring 22 and elements 3 and 4. The half pulleys 3 and 4 are moved over ring 22, in order that these half pulleys should thus be opened in successive locations and permit the entry and the leaving of the cable in and out of the driving pulley to occur without friction.

According to the present invention at least one of the half pulleys, for instance half pulley 4, shall be made of some distortable material, whereby this distortion shall however be so slight that the limit of elasticity of the material used will never be exceeded.

It is obvious that the half pulley which is made of such distortable material shall always be subjected to such distortion at successive locations of the circumference, due to the local influence of ring 22.

It has thus been obtained, on the one hand, that by means of springs 10 the cable is gripped over a large arc with uniform or practically uniform pressure, whereby this pressure which is exerted by the half pulleys upon the cable has been determined in advance, by the screwing in or out of the bolts 9, in such a manner that a slippage free drive of the cable is obtained without distortion of the latter, whereas on the other hand, the spreading of the half pulleys on one side, by means of aforesaid ring 22 and by local distortion of one half pulley, is such that no or practically no pressure increase occurs on the cable at the other side of the pulley.

It is obvious that the second half pulley may be made undistortable, or that both half pulleys may be made of some distortable material.

In the examples of FIGS. 1 to 5, ring 22 on the one hand, and elements 3 and 4 on the other hand, are provided with bevelled surfaces which are in contact with each other. It is however obvious, that instead of such a ring 22 with bevelled surfaces, a completely cylindrical ring could be used, in which case surfaces 15 and 16 should of course also be vertical with respect to the centerline of shaft A—A.

In FIGS. 6 to 9 a further alternative form of embodiment is finally shown, whereby the cable pulley is of integral construction and whereby spring elements are used around the entire circumference which firmly press the cable into the groove with uniform or practically uniform pressure, and whereby these spring elements are opened at the locations where the cable leaves the pulley or comes into contact therewith, for instance by means of cams, so that this opening has no influence upon the pressure exerted by said spring elements upon the cable.

In these Figures, the spring elements are made up of pairs of blocks 31–32 which are provided with bevelled surfaces, respectively 33 and 34, which can cooperate with the cable 13 in order to grip it tightly, whereby these small blocks are each fitted in a mobile manner upon the body of screws 35–36 and 37–38 which are screwed into the pulley itself 2 and whereby these screws can also be used for the fixing of leaf springs, respectively 39–40, which, as can clearly be seen on the drawing, supply the required pressure for gripping the cable.

In this case, each little block is further provided with rollers, respectively 41–42, 43–44 and 45–46, 47–48, which can cooperate with aforesaid guides or cams, respectively 49–50.

In this case also, the cable is pressed by means of springs 39 and 40 into the groove of driving pulley 2, so as to be driven without slippage by the latter, whereas the entrance and the leaving of the cable can also take place without friction by the pressing open of blocks 31 and 32 at the locations where the cable enters the driving pulley, or respectively leaves the latter.

The invention is by no means limited to the forms of embodiment described as examples and illustrated in the drawings, but such a hoisting device may be constructed in many forms and dimensions, without going beyond the scope of the present invention.

What I claim is:

1. Hoisting device, characterized by the fact that it mainly consists of a housing to which the load is suspended, and in this housing a driving pulley consisting of two half pulleys for the cable, which is suspended from a fixed point, whereby this driving pulley is provided with means which press the cable uniformly or practically uniformly into the driving pulley over a large arc, and with means which press aforesaid half pulleys away from each other at the locations where the cable enters and leaves the pulley, in such a manner that no friction occurs when the cable enters or leaves the driving pulley, whereby this pressing apart is performed in such a manner that no or practically no increase of pressure occurs on the cable on the other side of the pulley.

2. Hoisting device according to claim 1, characterized by the fact that one half pulley is made of some distortable material, whereas the other half pulley is made nondistortable.

3. Hoisting device according to claim 1, characterized by the fact that both half pulleys are made of some distortable material.

4. Hoisting device according to claim 2, characterized by the fact that aforesaid distortable half pulley is an integral part.

5. Hoisting device according to claim 3, characterized by the fact that aforesaid distortable half pulleys are each integral parts.

6. Hoisting device according to claim 1, characterized by the fact that the means for pressing aforesaid half pulleys apart consist of a roller or ring which is provided between the half pulleys and inside the outer circumference thereof.

7. Hoisting device according to claim 6, characterized by the fact that aforesaid roller or ring is fitted within a space which is hollowed out in aforesaid half pulleys.

8. Hoisting device according to claim 7, characterized by the fact that aforesaid spaces in each half pulley are of dinner plate shape, with the opening of the dinner plates directed towards each other.

9. Hoisting device according to claim 7, characterized by the fact that aforesaid roller or ring is of entirely cylindrical shape.

10. Hoisting device according to claim 7, characterized by the fact that aforesaid roller or ring is provided along its circumference with bevelled surfaces which correspond to the conicity of aforesaid spaces, or respectively with the bevel of the dinner plate borders.

11. Hoisting device according to claim 7, characterized by the fact that aforesaid roller or ring is fitted on a bearing around a disc which is excentric with respect to the drive shaft of the drive pulley, but which itself is fitted on a bearing in the center of the driving pulley or on the shaft of the driving pulley.

12. Hoisting device according to claim 11, characterized by the fact that aforesaid excentric disc is maintained fixed with respect to the housing of the hoisting device.

13. Hoisting device according to claim 7, characterized by the fact that aforesaid roller or ring rests on three rollers which are excentrically located with respect to the center line of the driving pulley.

14. Hoisting device according to claim 13, characterized by the fact that aforementioned rollers are fitted so as to rotate freely around shafts which themselves are solidly attached to the housing of the hoisting device.

15. Hoisting device according to claim 1, characterized by the fact that the two half pulleys are joined together by means of bolts located along a circle and which are fixed in one half pulley and along which the other half pulley is free to move, whereby spring means are provided, such as dished springs for instance, between each bolt head and the adjacent half pulley, the arrangement being such that the pulley halves act on the cable, alongst the largest part of their circumference, in parallel direction and with a substantially constant pressure, the deflection imparted by said roll or ring occurring only at the place of entry and exit of the cable.

16. Hoisting device according to claim 1, characterized by the fact that the groove of the cable pulley consists of a slanting surface on the inner wall of each element of the pulley.

17. Hoisting device according to claim 16, characterized by the fact that aforesaid slanting surfaces form a groove which progressively widens from the outer edge of the pulley towards the inside.

18. Hoisting device according to claim 17, characterized by the fact that aforesaid groove is of dovetail shape.

19. Hoisting device according to claim 1, characterized by the fact that it mainly consists of the combination of a housing to which the load is suspended, and in this housing a driving pulley consisting of two half pulleys for the cable, which is suspended from some fixed point, whereby the two half pulleys, at least one of which is made so as to be distortable, are joined together by means of bolts located along a circle and which are fixed to one half pulley, and over which the other half pulley is free to move, whereby spring means are provided, such as for instance dished springs, between each bolt head and the adjacent half pulley, one and other in such a manner that the half pulleys are continuously being pressed towards each other by a constant adjustable and uniform or almost uniform pressure, and whereby a roller or ring is provided, between and within the outer circumference of aforesaid half pulleys, which is located excentrically and which presses the half pulleys away from each other, one and other in such a manner that on the one hand, the cable which is fitted in a dovetail shaped groove is being gripped over a large arc with a uniform or almost uniform pressure, and on the other hand, that by local and temporary distortion of one or of both half pulleys the cable can enter and leave the driving pulley without friction and without or practically without alteration of the pressure exerted by aforementioned springs upon the cable.

20. Hoisting device according to claim 1, characterized by the fact that it consists mainly of a combination of a cable pulley; distributed along the circumference of this pulley, pairs of gripping elements under spring pressure for firmly pressing the cable, and means which press the pairs of gripping elements away from each other at the locations where the cable enters and leaves the pulley.

21. Hoisting device according to claim 20, characterized by the fact that aforesaid gripping elements each consist of an L shaped block which is attached so as to be free to move on one side of the pulley and which reaches over the cable.

22. Hoisting device according to claim 21, characterized by the fact that aforementioned block is provided, at the location of the cable, with a bevelled surface.

23. Hoisting device according to claim 21, characterized by the fact that each block is provided with a leaf spring or suchlike which constantly presses the block towards the cable.

24. Hoisting device according to claim 23, characterized by the fact that aforesaid blocks are each provided with rollers which can cooperate with means which locally press the pairs of blocks away from each other.

25. Hoisting device according to claim 23, characterized by the fact that aforementioned means consist of two guides or cams.

26. Hoisting device according to claim 2, characterized by the fact that aforesaid distortable half pulley is made of at least 2 parts.

27. Hoisting device according to claim 3, characterized by the fact that aforesaid distortable half pulleys are each made of at least two parts.

* * * * *